United States Patent

Andis

[11] 3,757,819
[45] Sept. 11, 1973

[54] OMNI-DIRECTIONAL FLUID-CONTROL VALVE

[76] Inventor: Allen Richard Andis, 3209 Elwood Dr., Racine, Wis. 53406

[22] Filed: Feb. 8, 1972

[21] Appl. No.: 224,570

[52] U.S. Cl. ........................................... 137/625.23
[51] Int. Cl. ............................................... F16k 11/02
[58] Field of Search ................. 137/625.23, 625.43, 137/625.47, 625.41; 251/315

[56] References Cited
UNITED STATES PATENTS

| 3,008,456 | 11/1961 | McCoy | 251/315 X |
| 2,535,580 | 12/1950 | Kersten | 137/625.41 |
| 3,056,418 | 10/1962 | Adams et al. | 137/625.41 X |
| 3,545,487 | 12/1970 | Kinner | 137/625.21 X |
| 3,626,938 | 12/1971 | Versaci | 137/625.47 X |

*Primary Examiner*—Henry T. Klinksiek
*Attorney*—Axel H. Johnson

[57] ABSTRACT

A fluid-control valve having a nutatable spherical control member seated in a body. A plurality of fluid passageways surround the spherical member and are in fluid connection therewith. The control member has peripheral ports that selectively direct the fluid in the passageways through conduits, when the control member is nutated, to operate hydraulic equipment.

5 Claims, 12 Drawing Figures

_3,757,819_

OMNI-DIRECTIONAL FLUID-CONTROL VALVE

BACKGROUND OF THE INVENTION

1. Field of the Invention

This invention concerns a valve for hydraulic systems that provides selective control of a plurality of hydraulic rams or similar equipment from one control station.

2. Description of the Prior Art

The prior art generally, comprises control equipment having sliding spools provided with axially-spaced circumferential reductions in diameter which serve to "valve" fluid into various passageways upon axial displacement of the spools.

SUMMARY OF THE INVENTION

This invention is an improvement on the valve embraced in U.S. Pat. No. 3,628,570, Inventor Allen Richard Andis, and issued Dec. 21, 1971 for an Omni-Directional Fluid-Control Valve. The control member of the present invention is of a spherical contour and substantially surrounded by a body portion in intimate spherical contact therewith. The control member can be nutated relative to its seat in the body by means of a handle. Annular passageways in the body surround the control member which is provided with peripheral, discrete ports on the spherical surface thereof. These ports are selectively brought into position relative to the passageways to permit fluid to flow from the supply line to one side of a double-acting hydraulic cylinder or ram, and to simultaneously permit fluid to escape from the other side thereof. An object, therefore, of this invention is to provide a fluid valve having a control member that functions by nutation in a plurality of planes. Another object is to provide a single valve unit that permits control of a plurality of hydraulic devices.

Further objects and advantages of this invention will become apparent from a consideration of the following detailed description. It is, however, to be understood that the invention is not to be limited to the details described, but includes all such variations as fall within the spirit of the invention.

Referring to the drawings.

Figure 1:
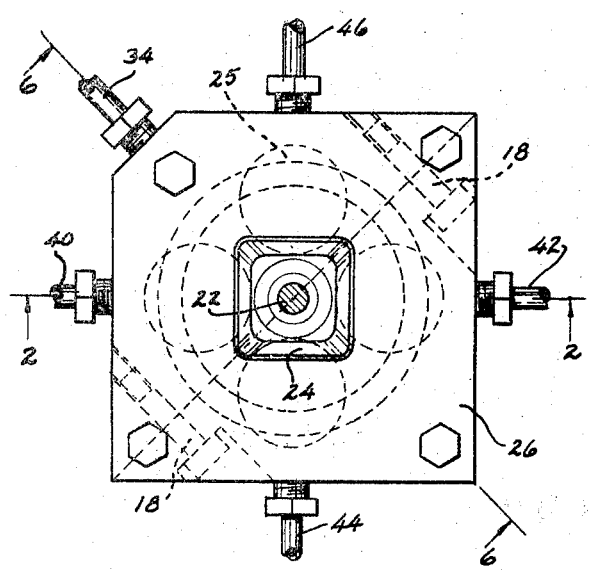
FIG. 1 is a top view of a typical valve embracing this invention.

A typical valve embracing this invention, comprises a body portion 10 of a suitable form, having separate portions 12 and 14 provided with mutual close fitting surfaces as at 16. Bolts 18 serve to secure portions 12 and 14 integrally.

Control member 20 comprises a spherical portion machined accurately in order to permit the number to nutate in a corresponding seat machined in the portions 12 and 14 of body 10. A control handle 22 is provided integrally with control member 20 to manually nutate or position the control member at the desired position. A knob 25 is provided for convenience. An opening 24 in body 10 limits angular nutation of the control member 20 to that necessary for a proper functioning of the valve. A cover plate 26 can be provided which can have openings or various contours to limit the movement of the handle 22, to suit the requirements.

A circumferential fluid inlet passageway 28 is provided in portions 12 and 14 surrounding control member 20, and which passageway is connected to a pump P to supply fluid under pressure to the passageway 28 by means of a conduit 30. A circumferential fluid outlet passageway 32 surrounds control member 20 and is substantially parallel to, and spaced from passageway 28. Passageway 32 is connected by a conduit 34 to a reservoir or sump R. A guide pin 36 is provided integrally in control member 20 and prevents rotation of member 20 about the axis of handle 22, by engagement with a slot 38 in portion 12 of body 10, but permits nutation of member 20.

Figure 8:
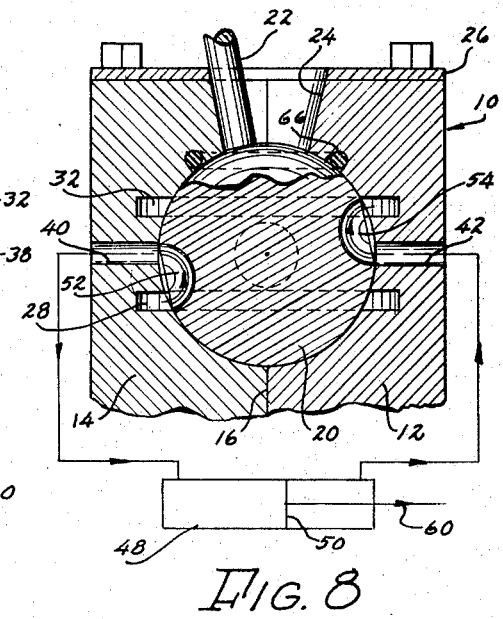
FIG. 8 is partially diagrammatic and illustrates the valve actuated to a position that forces the piston of the cylinder outwardly.
Figure 7:
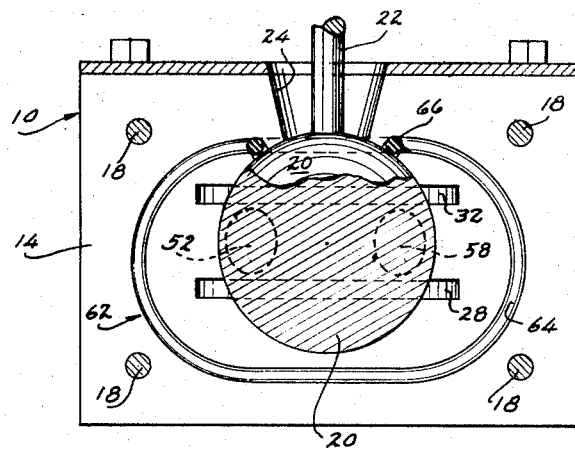
FIG. 7 is a section taken at 7—7 of FIG. 4, and showing the sealing member.
Figure 9:
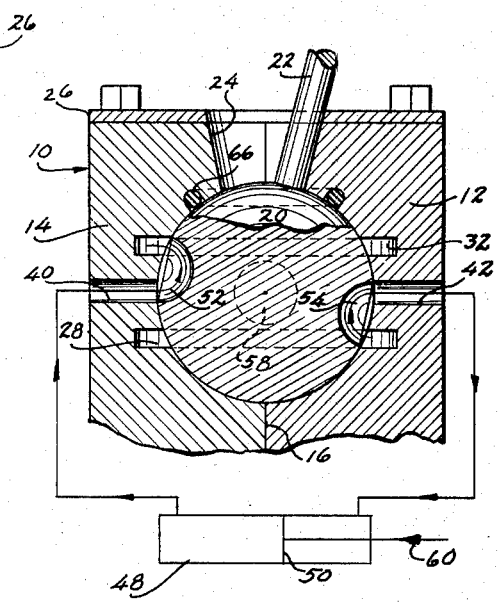
FIG. 9 is partially diagramatic and illustrates the valve actuated to a position that forces the piston of the cylinder inwardly.
Figures 10, 11, 12:
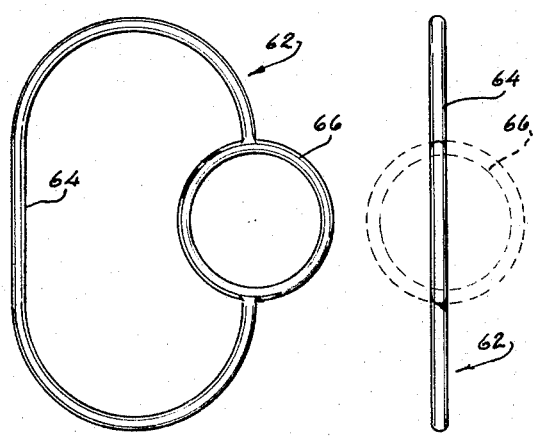
FIG. 10 is a view of the sealing member as molded.
FIG. 11 is an edge view of the sealing member shown in FIG. 10, with a portion thereof formed at right-angles to the plane shown in dotted lines.
FIG. 12 is a fragmentary edge view of the sealing member as it appears when assembled in the body of the valve.

A plurality of fluid conduits 40, 42, 44 and 46 are provided which are directed toward, and in fluid contact with the control member 20. Conduits 40 and 42 are connected to a cylinder or ram 48 having a piston 50 as shown in FIGS. 8 and 9.

Figure 2:
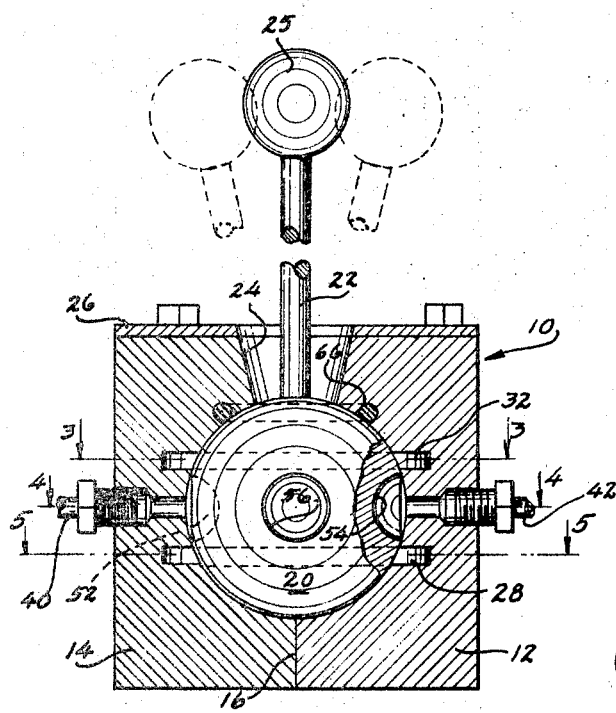
FIG. 2 is a section taken at 2—2 of FIG. 1.
Figure 3:
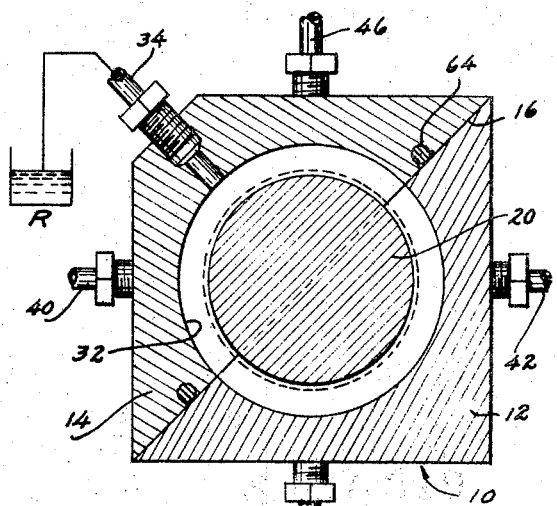
FIG. 3 is a section taken at 3—3 of FIG. 2.
Figure 4:
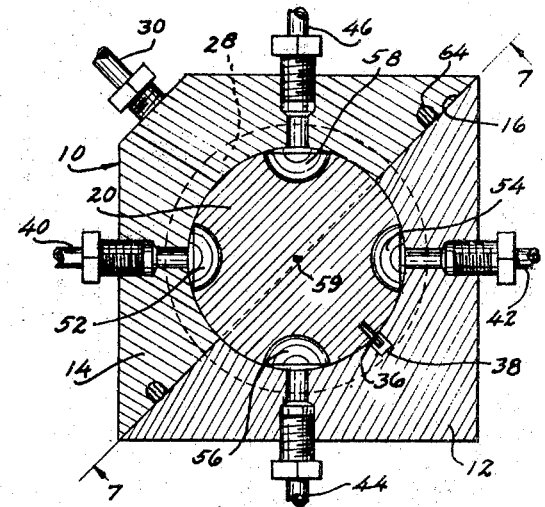
FIG. 4 is a section taken at 4—4 of FIG. 2.
Figure 5:
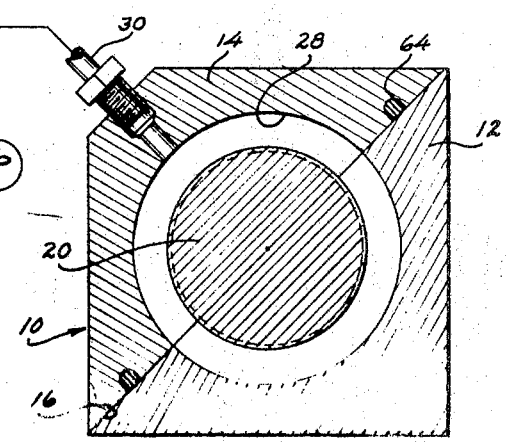
FIG. 5 is a section taken at 5—5 of FIG. 2.
Figure 6:
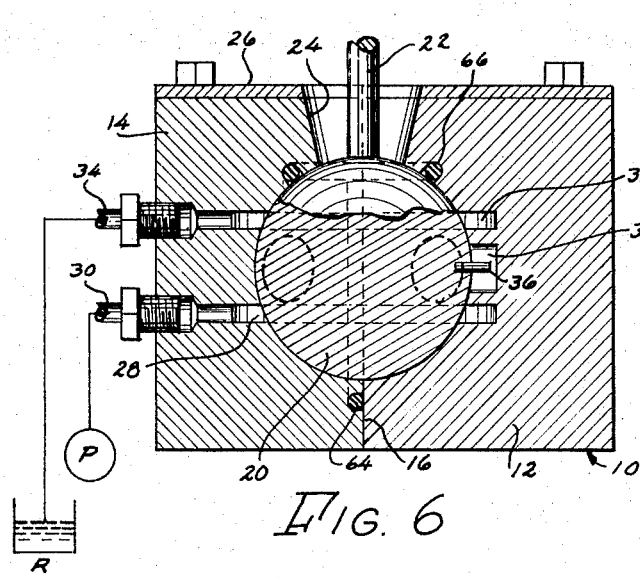
FIG. 6 is a section taken at 6—6 of FIG. 1.

The surface of control member 20 is provided with circumferentially spaced semi-spherical ports 52, 54, 56 and 58 which are positioned in a plane defined by the central point 59 of the control member, and which plane is normal to the axis of handle 22. When control member 20 is in the neutral position as in FIGS. 2 and 4, ports 52, 54, 56 and 58 are axially-aligned with their respective conduits 40, 42, 44 and 46, and the system is at rest or in neutral. The cylinder 48, in this instance, is double-acting; fluid being engaged to both sides of the piston. If the piston 50, as shown in FIG. 8, is to be moved in the direction of arrow 60, handle 22 is positioned to the left. Port 52 will then be positioned so as to permit fluid under pressure to flow from passageway 28 into port 52 through conduit 40 and to cylinder 48, causing the piston 50 to move to the right in the direction of arrow 60. Inasmuch as cylinder 48 is double-acting, fluid on the opposite side of the piston 50 will then flow into conduit 42 through port 54, into passageway 32 and through conduit 34 to the reservoir R. If the piston 50 is to be moved in the direction of the arrow 60 as shown in FIG. 9, handle 22 is positioned to the right. Port 54 will then be positioned so as to permit fluid to flow under pressure from passageway 28, into port 54, through conduit 42 and into cylinder 48, causing the piston to move to the left. Fluid on the left side of the piston 50 will then flow into conduit 40 through port 52, into passageway 32 and escape through conduit 34, to be deposited into the reservoir R. If the cylinder 48 is connected to conduits 44 and 46, as shown in FIG. 4, the operation will be identical to that described with respect to conduits 40 and 42. The purpose in providing the plurality of conduits is to permit control of a plurality of cylinders from one control valve, selectively: It being merely necessary to move the handle 22 in the desired direction.

In order to assure a leak-proof condition between the mutual surfaces of portions 12 and 14, indicated 16, and the opening 24, a sealing member 62 of suitable material such as rubber, is employed, having a static portion 64. A groove is provided in the surface of portion 14 to receive the "static" portion 64. When portion 64 is inserted in the groove, the ring portion 66 is disposed at a right angle to the portion 64 and inserted in the surface of the portions 12 and 14 that engages the surface of the spherical member 20. Thus sealing member 62 comprises a combined "static" and "dynamic" seal.

The above being a complete description of an illustrative embodiment of the invention, what is claimed as new and desired to be secured by Letters Patent of the United States is:

1. A fluid-control valve, comprising a body, and a spherical nutatable control member surrounded by said body, said body and said control member having intimately contacting surfaces generated from a mutual central point, an aperture provided in said body exposing said control member, and a nutation-effecting means extending radially from said control member through said aperture, and defined by an axis passing through said central point, said body having a fluid inlet passageway, and a fluid outlet passageway, said passageways being spaced apart and surround said control member to provide peripheral fluid contact with the surface of said control member, a plurality of conduits provided in said body intermediate said passageways and directed to provide intimate fluid engagement with said control member, said control member having a plurality of discrete, circumferentially positioned ports on the surface thereof, said ports positionable to selectively direct fluid to flow through either of said passageways and said conduits upon nutation of said control member.

2. A fluid-control valve as set forth in claim 1, in which said passageways are defined by substantially-parallel planes.

3. A fluid-control valve as set forth in claim 1, in which said conduits are positioned in a plane passing through said central point.

4. A fluid-control valve as set forth in claim 1, in which said conduits are uniformly and circumferentially spaced in said plane about said control member.

5. A fluid-control valve as set forth in claim 1, in which said ports are uniformly and circumferentially spaced about the periphery of said spherical control member, and defined by a plane normal to said axis passing through said central point and selectively alignable with said conduits and said passageways to permit flow of fluid upon nutation of said control member.

* * * * *